US010724871B2

(12) United States Patent
Laine et al.

(10) Patent No.: US 10,724,871 B2
(45) Date of Patent: Jul. 28, 2020

(54) CAMERA-BASED HEADING-HOLD NAVIGATION

(71) Applicant: The Charles Stark Draper Laboratory, Inc., Cambridge, MA (US)

(72) Inventors: Juha-Pekka J. Laine, Boston, MA (US); Simone B. Bortolami, Belmont, MA (US); Jeffrey Korn, Lexington, MA (US); Gregory P. Blasche, Burlington, MA (US); Matthew T. Jamula, Wilmington, MA (US); Paul A. Bohn, St. Petersburg, FL (US); Robin Mark Adrian Dawson, Waltham, MA (US); Benjamin F. Lane, Sherborn, MA (US); Eric T. Hoke, Somerville, MA (US); Daniel M. Meiser, Providence, RI (US); Joseph M. Kinast, Cambridge, MA (US); Timothy J. McCarthy, Danvers, MA (US); Stephen P. Smith, Acton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 302 days.

(21) Appl. No.: 15/803,367

(22) Filed: Nov. 3, 2017

(65) Prior Publication Data
US 2018/0120122 A1 May 3, 2018

Related U.S. Application Data

(60) Provisional application No. 62/417,181, filed on Nov. 3, 2016.

(51) Int. Cl.
*G01C 21/36* (2006.01)
*G06T 7/73* (2017.01)
(Continued)

(52) U.S. Cl.
CPC ......... *G01C 21/3647* (2013.01); *G01C 17/38* (2013.01); *G01C 21/3602* (2013.01); *G06T 7/74* (2017.01); *H04W 4/026* (2013.01)

(58) Field of Classification Search
CPC ................ G01C 21/3647; G01C 17/38; G01C 21/3602; G06T 7/74; H04W 4/026
(Continued)

(56) References Cited

U.S. PATENT DOCUMENTS 5,179,519 A * 1/1993 Adachi ................ G01C 21/367
340/990
6,381,540 B1 * 4/2002 Beason ..................... G01C 5/06
342/120

(Continued)

FOREIGN PATENT DOCUMENTS

EP  2600109 A2  6/2013
EP  2930466 A1  10/2015

OTHER PUBLICATIONS

European Patent Office, International Search Report, International Application No. PCT/US2017/059988, together with the Written Opinion of the International Searching Authority, 15 pages, dated Feb. 7, 2018.

*Primary Examiner* — Tuan C To
(74) *Attorney, Agent, or Firm* — Sunstein LLP

(57) ABSTRACT

A visual navigation system includes a compass configured to orient a user in a heading direction, an image sensor configured to capture a series of successive navigation images in the heading direction, one or more of the navigation images having at least two reference markers, data storage memory configured to store the series of successive navigation images, a navigation processor configured to identify at least one principal marker and at least one ancillary marker from the at least two reference markers, the principal marker positioned within a principal angle and the ancillary (Continued)

marker positioned within an ancillary angle, which is greater than the principal angle, and to determine heading direction information based on a position of the at least one principal marker and/or the at least one ancillary marker in the successive navigation images, and a user interface configured to provide the heading direction information to the user.

26 Claims, 10 Drawing Sheets

(51) Int. Cl.
*H04W 4/02* (2018.01)
*G01C 17/38* (2006.01)

(58) Field of Classification Search
USPC .......................................................... 701/428
See application file for complete search history.

(56) References Cited

U.S. PATENT DOCUMENTS

| | | | | |
|---|---|---|---|---|
| 6,819,779 | B1* | 11/2004 | Nichani | G06K 9/00798 382/104 |
| 8,098,280 | B2* | 1/2012 | Shimizu | G06T 7/73 348/116 |
| 9,062,979 | B1* | 6/2015 | Ferguson | G01C 21/30 |
| 9,372,070 | B1* | 6/2016 | Jancic | G01B 11/026 |
| 10,366,523 | B2* | 7/2019 | Chen | G01C 21/26 |
| 2004/0046712 | A1* | 3/2004 | Naimer | G01C 23/005 345/9 |
| 2005/0057745 | A1* | 3/2005 | Bontje | G01C 15/002 356/139.03 |
| 2009/0187339 | A1* | 7/2009 | DeVries | G01C 21/3626 701/433 |
| 2011/0188760 | A1* | 8/2011 | Wright | G06T 17/05 382/203 |
| 2011/0275408 | A1 | 11/2011 | Kulik | |
| 2012/0185165 | A1* | 7/2012 | Geelen | G01C 21/3647 701/436 |
| 2012/0197519 | A1* | 8/2012 | Richardson | G01C 21/20 701/408 |
| 2013/0002857 | A1 | 1/2013 | Kulik | |
| 2013/0332066 | A1* | 12/2013 | Jeung | G01C 21/3602 701/420 |
| 2014/0005928 | A1* | 1/2014 | Giannetta | G01S 19/49 701/431 |
| 2014/0010413 | A1 | 1/2014 | Reymond et al. | |
| 2015/0317057 | A1* | 11/2015 | Choi | H04L 67/38 715/757 |
| 2016/0209233 | A1* | 7/2016 | Harvey | G01C 23/005 |
| 2016/0272196 | A1* | 9/2016 | Hocking | B60W 30/02 |
| 2017/0315558 | A1* | 11/2017 | Vojak | G01C 21/20 |
| 2017/0352941 | A1* | 12/2017 | Peitzer | H04M 1/72527 |
| 2018/0018502 | A1* | 1/2018 | Rao | B01F 3/04517 |
| 2019/0072392 | A1* | 3/2019 | Haspel | G01C 21/00 |

* cited by examiner

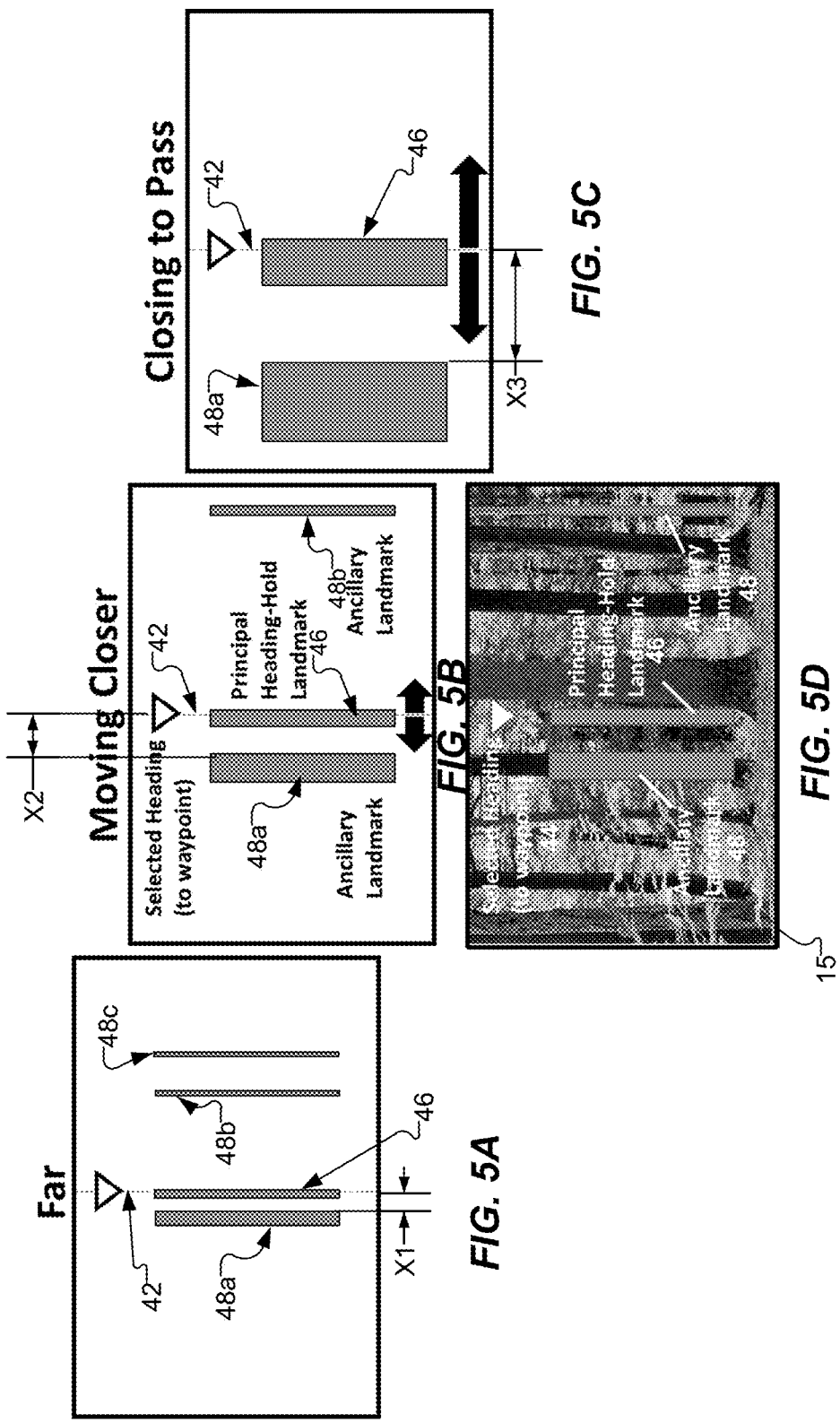

CAMERA-BASED HEADING-HOLD NAVIGATION

CROSS-REFERENCE TO RELATED APPLICATIONS

This patent application claims the benefit of U.S. Provisional Patent Application No. 62/417,181, filed Nov. 3, 2016, the disclosure of which is incorporated by reference herein in its entirety.

TECHNICAL FIELD

The disclosure generally relates to methods and systems for visual navigation and, more particularly, the disclosure relates to camera-based methods and systems for navigation.

BACKGROUND

Navigation has been, since ancient times, necessary for the development of economic and social activity. Navigation can also be essential in situations or environments in which safety of the navigator is not secured. The challenge in navigating accurately to a destination or direction is compounded with navigation instruments that have errors and/or in areas without connection to a satellite when attempting to use a global positioning system (GPS). For example, a soldier or sailor may depend on navigation systems and techniques to get to safety and may be unable to do so in GPS-denied areas.

All currently available image-based long-range land navigation techniques either conduct vision-based odometry or match images against landmarks stored in a database. Both of these techniques have disadvantages. Vision-based odometry only reduces the drift of an inertial navigation system (INS) solution, which is based on position and orientation, by automatically keeping track of arbitrary features in successive image frames as the platform moves. However, vision-based odometry itself has a position error growth rate as a function of distance traveled. In landmark matching, landmarks are sighted with an image sensor, e.g., camera or some other imaging sensor, including radar, after which the images are compared against existing imagery maps in an automated catalog system, providing a solution for the image sensor position and orientation. This solution can be precise, but suffers from several drawbacks. First, the landmarks need to be cataloged in a database and then must be visible to the image sensor. Second, the match-based positioning suffers from significant ranging and rotation errors due to the fact that slightly different perspectives of the landmarks, e.g., rotated to the left, right, front or back, appear the same to the image sensor, and thus result in an error in the image sensor position and orientation. Third, a comprehensive, stored, landmark database may be quite large, depending on the application, which requires large data storage memory.

SUMMARY

In accordance with one embodiment of the invention, a visual navigation system for navigating toward a heading direction includes a compass providing compass measurements configured to orient a user in the heading direction, an image sensor, in communication with the compass, the image sensor configured to capture a series of successive navigation images in the heading direction, one or more of the navigation images having at least two reference markers, data storage memory configured to store the series of successive navigation images, a navigation processor, coupled to the data storage memory, configured to (a) identify at least one principal marker from the at least two reference markers, the at least one principal marker positioned within a principal angle relative to the heading direction from a position of the image sensor, (b) identify at least one ancillary marker from the at least two reference markers, the at least one ancillary marker positioned within an ancillary angle relative to the heading direction from the position of the image sensor, the ancillary angle greater than the principal angle, and (c) determine heading direction information based on a position of the at least one principal marker and/or a position of the at least one ancillary marker in the successive navigation images, a user interface, coupled to the navigation processor, configured to provide the heading direction information to the user.

In related embodiments, the data storage memory may be further configured to store two or more compass measurements, each compass measurement taken at a different location when traveling in the heading direction, and the navigation processor may further include a navigation filter configured to process the two or more compass measurements, wherein the navigation processor may determine the heading direction information further based on the processed two or more compass measurements. The navigation filter may compute an average of the two or more compass measurements and use the average along with the position of the at least one principal marker and/or the position of the at least one ancillary marker in the successive navigation images to estimate the heading direction information. The navigation processor may be configured to receive landmark information from a landmark map, at least a portion of the landmark information corresponding to one or more of the reference markers, wherein the navigation processor may further identify the at least one principal marker from the landmark information and/or further identify the at least one ancillary marker from the landmark information, and the navigation processor may be configured to determine the heading direction information further based on the landmark information. The navigation processor may be configured to determine the heading direction information by comparing (a) the position of the at least one principal marker in the one or more navigation images to a subsequent position of the at least one principal marker in one or more subsequent navigation images taken at a time after the one or more navigation images and/or (b) the position of the at least one ancillary marker in the one or more navigation images to a subsequent position of the at least one ancillary marker in one or more subsequent navigation images taken at a time after the one or more navigation images. The navigation processor may be configured to receive inertial navigation information from an inertial measurement unit sensor, wherein the navigation processor determines the heading direction information further based on the inertial navigation information. The inertial navigation information may include a step-count-based estimate for distance traveled by the user or a tread/wheel-turn-based estimate for distance traveled by a vehicle transporting the user. The navigation processor may be configured to receive altitude information from a pressure altimeter and configured to receive topographic map information from a topographic map, wherein the navigation processor determines navigation information based on the altitude information in conjunction with the topographic map information and determines the heading direction information further based on the navigation information. The compass, the image sensor, the data storage memory, the navigation processor, and the user interface may be contained within a hand-held device. The user interface may include an audio output, visual output, tactile output or any combination thereof.

In accordance with another embodiment of the invention, a method for navigating toward a heading direction includes providing a compass having compass measurements configured to orient a user in the heading direction, capturing a series of successive navigation images in the heading direction using an image sensor, one or more of the navigation images having at least two reference markers, storing the series of successive navigation images in a data storage memory, identifying at least one principal marker from the at least two reference markers, the at least one principal marker positioned within a principal angle relative to the heading direction from a position of the image sensor, identifying at least one ancillary marker from the at least two reference markers, the at least one ancillary marker positioned within an ancillary angle relative to the heading direction from the position of the image sensor, the ancillary angle greater than the principal angle, determining heading direction information based on a position of the at least one principal marker and/or a position of the at least one ancillary marker in the successive navigation images, and providing the heading direction information to a user interface.

In related embodiments, the method may further include storing two or more compass measurements in the data storage memory, each compass measurement taken at a different location when traveling in the heading direction, and processing the two or more compass measurements using a navigation filter, wherein determining the heading direction information may be further based on the processed two or more compass measurements. Processing the two or more compass measurements may include computing an average of the two or more compass measurements, and determining the heading direction information may be further based on the average. The method may further include providing landmark information from a landmark map, at least a portion of the landmark information corresponding to one or more of the reference markers, wherein identifying the at least one principal marker may further include identifying the at least one principal marker from the landmark information and/or identifying the at least one ancillary marker may further include identifying the at least one ancillary marker from the landmark information, and determining the heading direction information may be further based on the landmark information. Determining may further include comparing the position of the at least one principal marker in the one or more navigation images to a subsequent position of the at least one principal marker in one or more subsequent navigation images taken at a time after the one or more navigation images and/or comparing the position of the at least one ancillary marker in the one or more navigation images to a subsequent position of the at least one ancillary marker in one or more subsequent navigation images taken at a time after the one or more navigation images. The method may further include providing inertial navigation information from an inertial measurement unit, wherein determining the heading direction information may be further based on the inertial navigation information. The inertial navigation information may include a step-count-based estimate for distance traveled by the user or a tread/wheel-turn-based estimate for distance traveled by a vehicle transporting the user. The method may further include providing altitude information from a pressure altimeter, accessing a topographic map having topographic map information, and determining navigation information based on the altitude information and the topographic map information, wherein determining the heading direction information may be further based on the navigation information.

In accordance with another embodiment of the invention, a computer program product including non-transitory computer-readable medium having computer code thereon for navigating toward a heading direction includes program code for providing compass measurements from a compass, the compass measurements configured to orient a user in the heading direction, program code for capturing a series of successive navigation images in the heading direction using an image sensor, one or more of the navigation images having at least two reference markers, program code for storing the series of successive navigation images in a data storage memory, program code for identifying at least one principal marker from the at least two reference markers, the at least one principal marker positioned within a principal angle relative to the heading direction from a position of the image sensor, program code for identifying at least one ancillary marker from the at least two reference markers, the at least one ancillary marker positioned within an ancillary angle relative to the heading direction from the position of the image sensor, the ancillary angle greater than the principal angle, program code for determining heading direction information based on a position of the at least one principal marker and/or a position of the at least one ancillary marker in the successive navigation images, and program code for providing the heading direction information to a user interface.

In related embodiments, the computer program product may further include program code for storing two or more compass measurements in the data storage memory, each compass measurement taken at a different location when traveling in the heading direction, and program code for processing the two or more compass measurements using a navigation filter, wherein program code for determining the heading direction information may be further based on the processed two or more compass measurements. Program code for processing the two or more compass measurements may include computing an average of the two or more compass measurements, and the program code for determining the heading direction information may be further based on the average. The computer program product may further include program code for providing landmark information from a map, at least a portion of the landmark information corresponding to one or more of the reference markers, wherein identifying the at least one principal marker may further include identifying the at least one principal marker from the landmark information and/or identifying the at least one ancillary marker may further include identifying the at least one ancillary marker from the landmark information, and determining the heading direction information may be further based on the landmark information. The program code for determining may further include program code for comparing the position of the at least one principal marker in the one or more navigation images to a subsequent position of the at least one principal marker in one or more subsequent navigation images taken at a time after the one or more navigation images and/or program code for comparing the position of the at least one ancillary marker in the one or more navigation images to a subsequent position of the at least one ancillary marker in one or more subsequent navigation images taken at a time after the one or more navigation images. The computer program produce may further include program code for providing inertial navigation information from an inertial measurement unit, wherein the program code for determining the heading direction information may be further based on the inertial navigation information. The inertial navigation information may include a step-count-based estimate for distance traveled by the user or a tread/wheel-turn-based estimate for distance traveled by a vehicle transporting the user. The computer program code may further include program code for providing altitude information from a pressure altimeter, program code for accessing a topographic map having topographic map information, and program code for determining navigation information based on the altitude information and the topographic map information, wherein the program code for determining the heading direction information may be further based on the navigation information.

BRIEF DESCRIPTION OF THE DRAWINGS

Those skilled in the art should more fully appreciate advantages of various embodiments from the following "Detailed Description," discussed with reference to the drawings summarized immediately below.

FIGS. 5A-5C are a series of diagrams illustrating the use of principal and ancillary markers in a navigation system according to an embodiment of the present invention. FIG. 5D shows FIG. 4B with diagrams of the principal and ancillary landmarks from FIG. 5B superimposed on the captured image according to an embodiment of the present invention.

DETAILED DESCRIPTION

Figure 1:
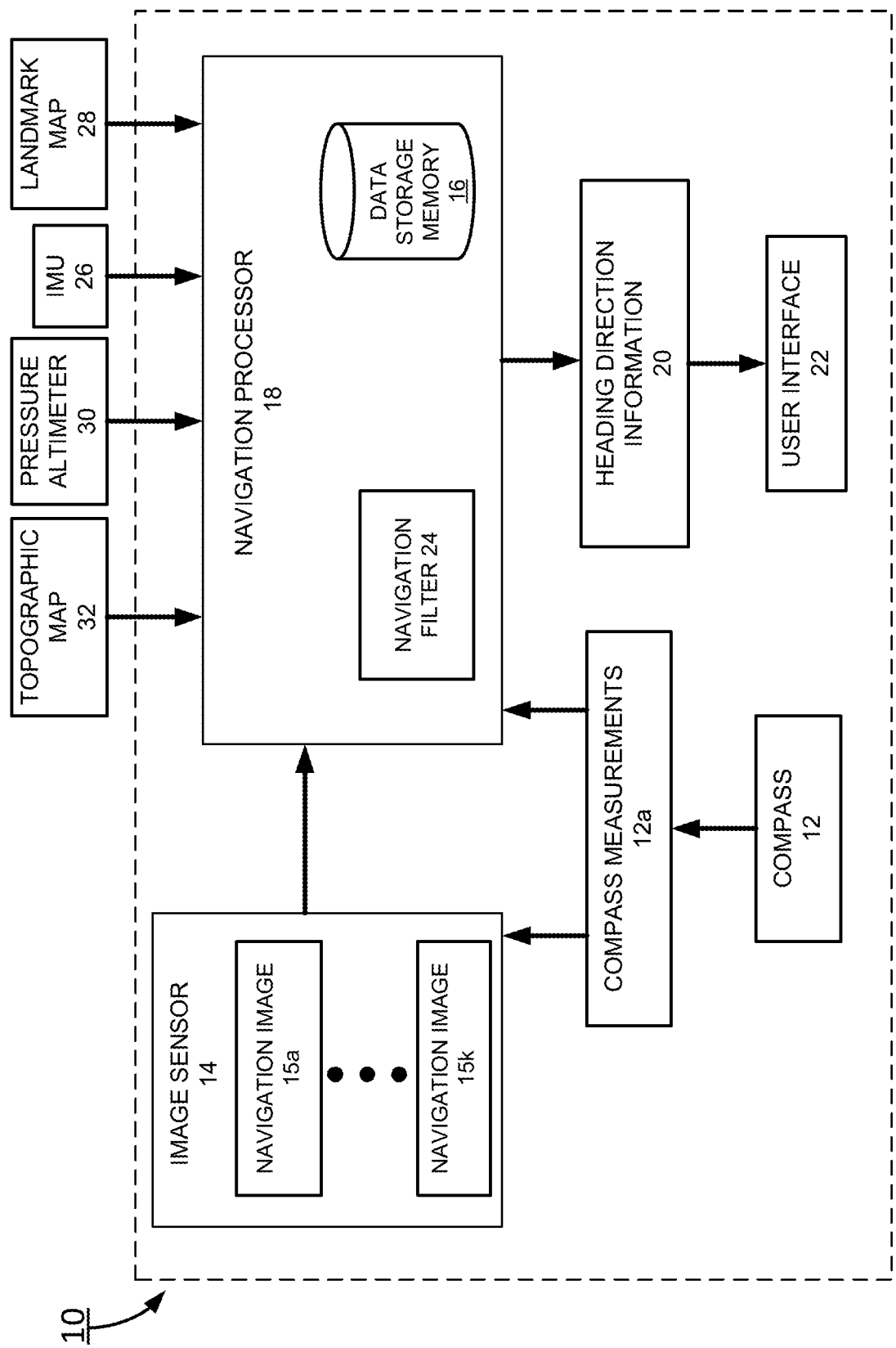
FIG. 1 is a schematic diagram of a visual navigation system according to an embodiment of the present invention.

When the need for navigation arises, conventional tools such as GPS, cellular connection, or maps are not always available. For example, a soldier stranded in a hostile environment may not have access to GPS, but needs to be able to accurately travel in a desired direction, such as in the direction of friendly territory or camp. Embodiments of the present invention provide a visual navigation system and method that aid a user in maintaining a travel heading by using a compass to keep the user oriented in the desired direction while also automatically capturing macroscopic fixed reference markers in the environment, preferably selected as far as possible in the direction of travel, in order to minimize errors such as drift and disorientation associated with the user following only the compass measurements. The visual navigation system and method allow the position errors and drift mechanisms, such as in vision-based odometry, to be minimized and eliminate the need for a reference database, such as in landmark matching, although one may be used.

Embodiments accomplish this improved navigation by automatically observing arbitrary reference markers in the direction of travel, categorizing the reference markers as principal or ancillary markers depending on their distance from the direction of travel, and automatically tracking these reference markers in order to maintain the heading direction while traveling towards a waypoint or following a navigation course using a compass. New principal reference markers and ancillary reference markers may be continuously selected as the user travels towards the waypoint or follows the navigation course. For example, principal markers that are close to or along the heading direction may be replaced whenever possible with other principal markers that are close to or along the heading direction but further away from the user and closer to the waypoint or ultimate destination. When the principal markers fall out of view, the ancillary markers may be used to stay on course, hold heading, as well as monitor course offset and correct back to the heading direction in case the user has drifted significantly to one side of the intended course. Once the user arrives at a destination or target waypoint, the process may be repeated, in order to travel to the next waypoint or to continue along the navigation course. This compass-based visual navigation system and method are referred to herein as "heading-hold" navigation.

As opposed to vision-based odometry or landmark-match navigation, embodiments of the present invention do not attempt to provide position information to the user, but rather maintain the user on a very accurate heading to a waypoint or along a navigation course that passes through waypoints. Meaningful drift mechanisms are mitigated, since the heading is maintained by tracking reference markers as close to the waypoint as possible. In addition, drift mechanisms may be further reduced by integrating compass heading measurements over time with camera-observed changes or noise in the heading, referred to herein as "heading-hold" navigation with correction, and by re-acquiring prior reference markers as they become visible again. Details of illustrative embodiments are discussed below.

Heading-Hold Navigation

Figure 2:
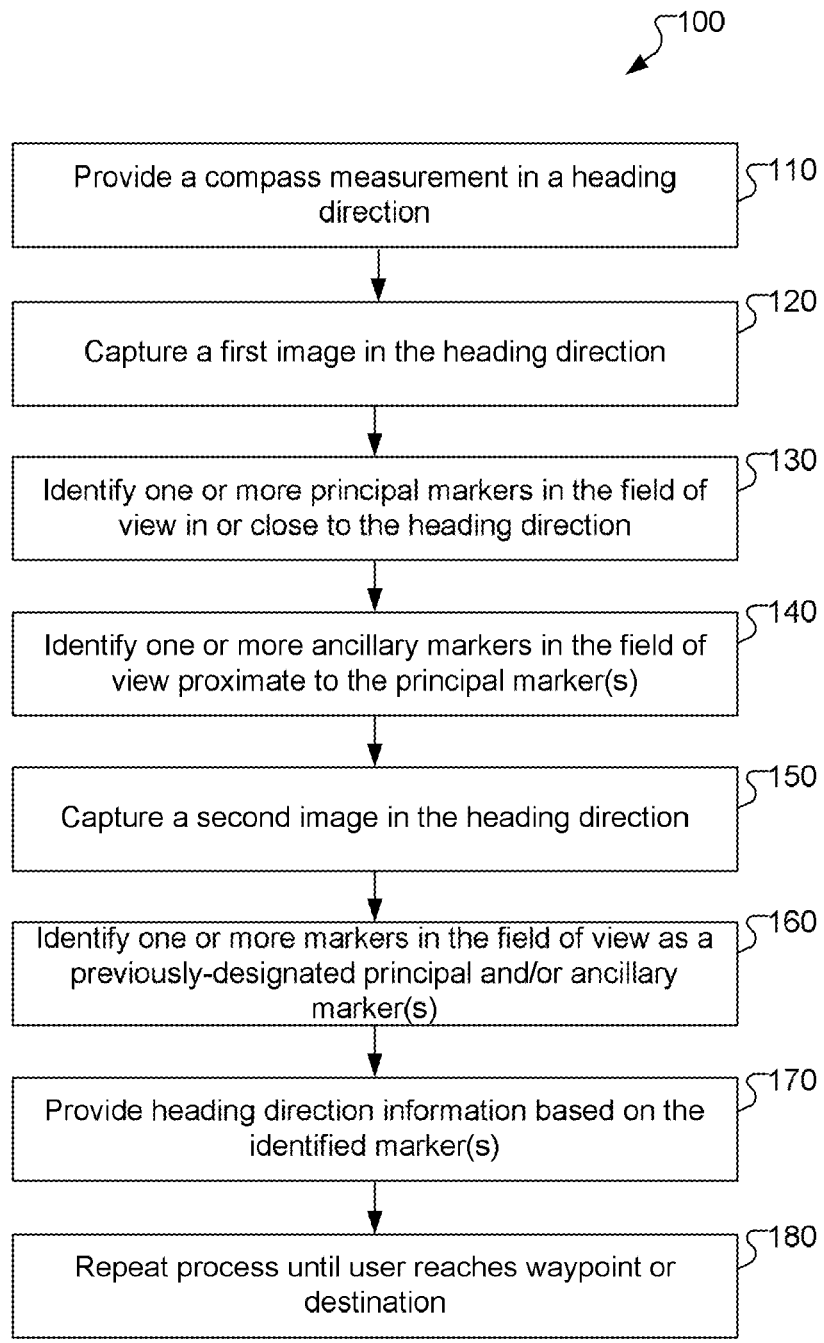
FIG. 2 is a flowchart of an exemplary method for navigating in a heading direction according to an embodiment of the present invention.

FIG. 1 is a schematic diagram of a visual navigation system 10 and FIG. 2 is a flowchart illustrating a method 100 for navigating in a heading direction using the visual navigation system 10 according to embodiments of the present invention. Referring to FIGS. 1 and 2, the visual navigation system 10 includes a compass 12 that provides compass measurements 12a to a user so that the user can travel in a desired heading direction (step 110) to a location or waypoint or along a navigation course.

Figure 3A:
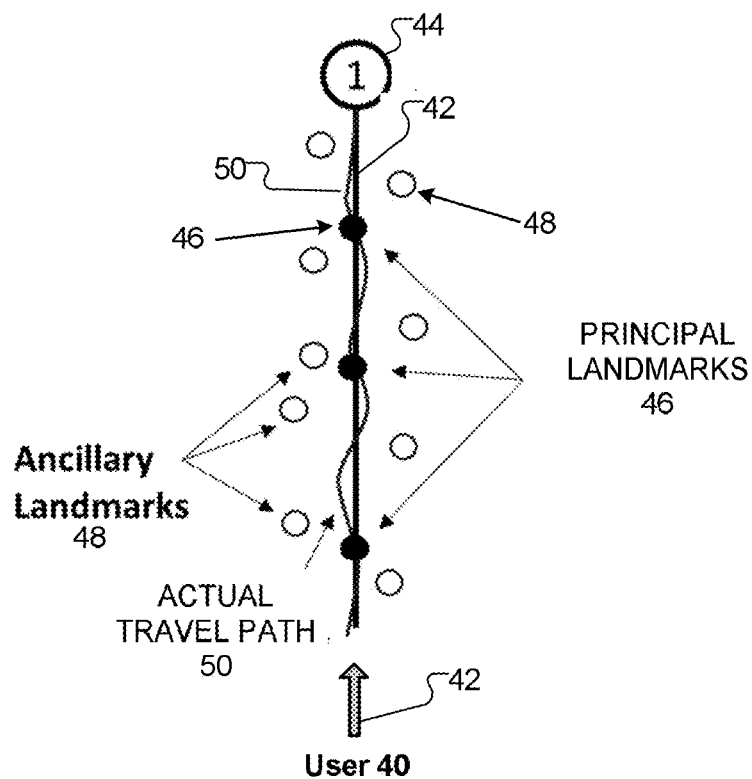
FIG. 3A is a diagram of an exemplary travel path in a desired travel direction of a user according to an embodiment of the present invention.

For example, as shown in FIG. 3A, a user 40 has a compass 12, or is riding in a vehicle that has a compass 12, and uses the compass 12 to determine a desired travel direction 42 to a location or waypoint 44. The travel direction 42 is indicated by the solid, straight line 42 between the user 40 and the waypoint 44. For example, a dismounted soldier in unsettled terrain may have identified 'north' as the direction to safety (waypoint 44). Along the travel direction 42, the user 40 sees one or more reference markers. For example, the reference markers in unsettled terrain may be particular trees, rocks, hills, or other fixtures in a landscape or may include the sun, islands, landforms, anchored vessels, or other markers in a seacape. The reference markers may be identified as principal markers 46 or ancillary markers 48 depending on their distance away from the travel direction 42 from the view point of the user 40 facing in the travel direction 42. The one or more principal markers 46 are chosen close to or along the travel direction 42, e.g., within a principal angle from the travel direction 42 from the view point of the user 40, and the one or more ancillary markers 48 are chosen further away from the travel direction 42, e.g., within an ancillary angle from the travel direction 42, which is greater than the principal angle. The principal markers 46 and/or the ancillary markers 48, when used in conjunction with the compass 12, can aid the user 40 to hold heading to the waypoint 44, even when an actual travel path 50 of the user 40 may veer or drift away from the desired travel direction 42.

Figure 3B:
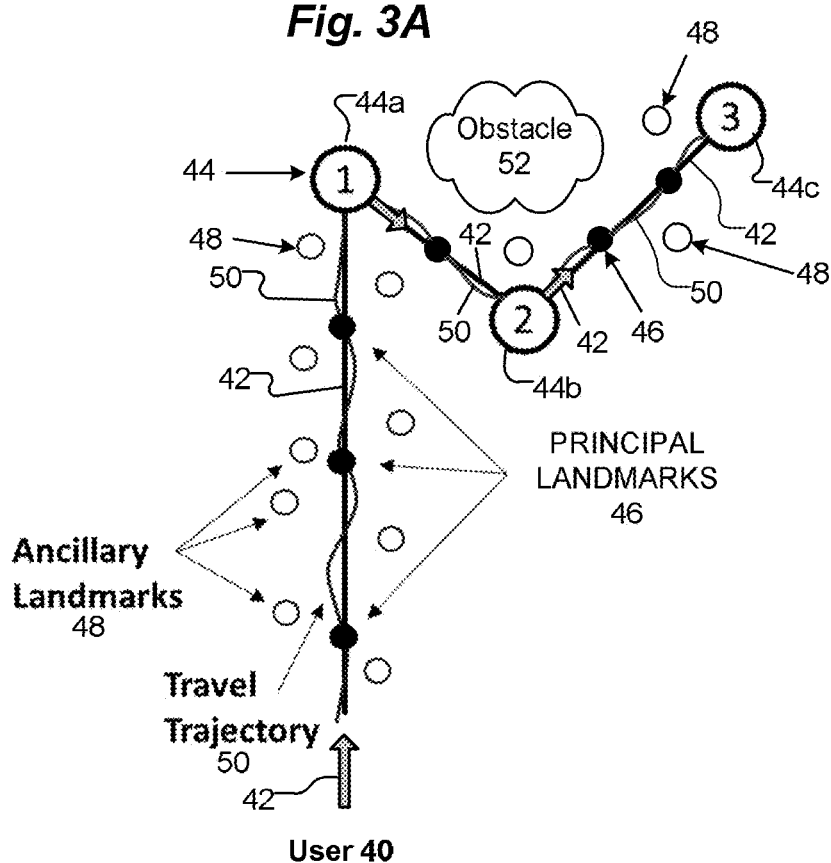
FIG. 3B is a diagram of an exemplary travel path having more than one waypoint according to an embodiment of the present invention.

As shown in FIG. 3B, more than one waypoint 44 (shown as 44a-44c) may be used along the way in order to reach the ultimate destination. For example, two or more waypoints 44a-44c may be useful when navigating around an obstacle 52, such as impassable mountains or waterways. Two or more waypoints 44a-44c also may be useful when a user 40 needs to reach multiple waypoints. For example, a soldier may need to stop to pick up supplies (waypoints 44a and 44b) on the way to camp (waypoint 44c). Thus, between each waypoint 44, the visual navigation system 10 may identify principal markers 46 and ancillary markers 48 to enable the user 40 to travel in a desired heading direction 42 to reach a final destination.

Figure 4A:
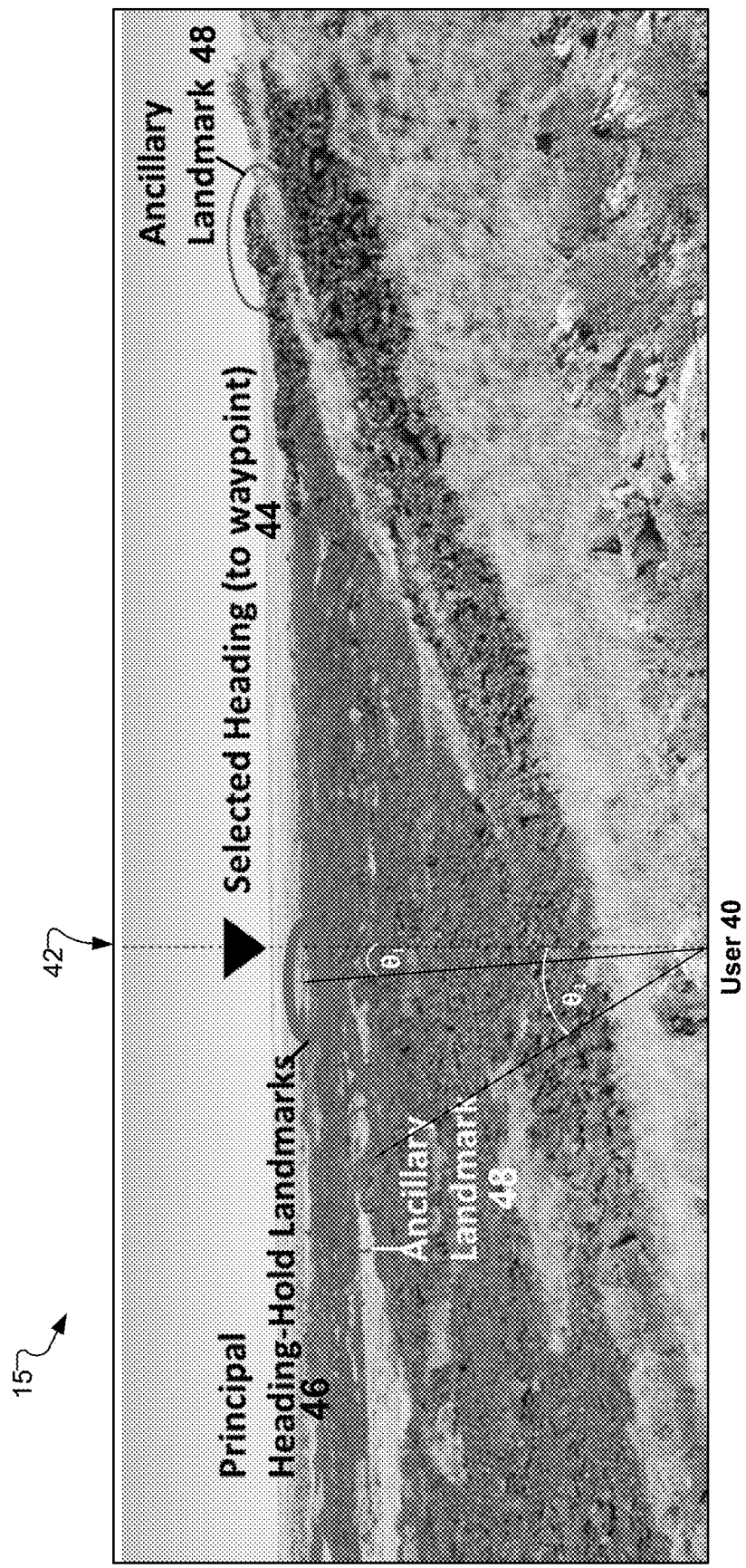
FIGS. 4A-4B are captured images of exemplary landscapes that enable the navigation system to guide a user in a desired travel direction or heading direction according to an embodiment of the present invention.
Figure 4B:
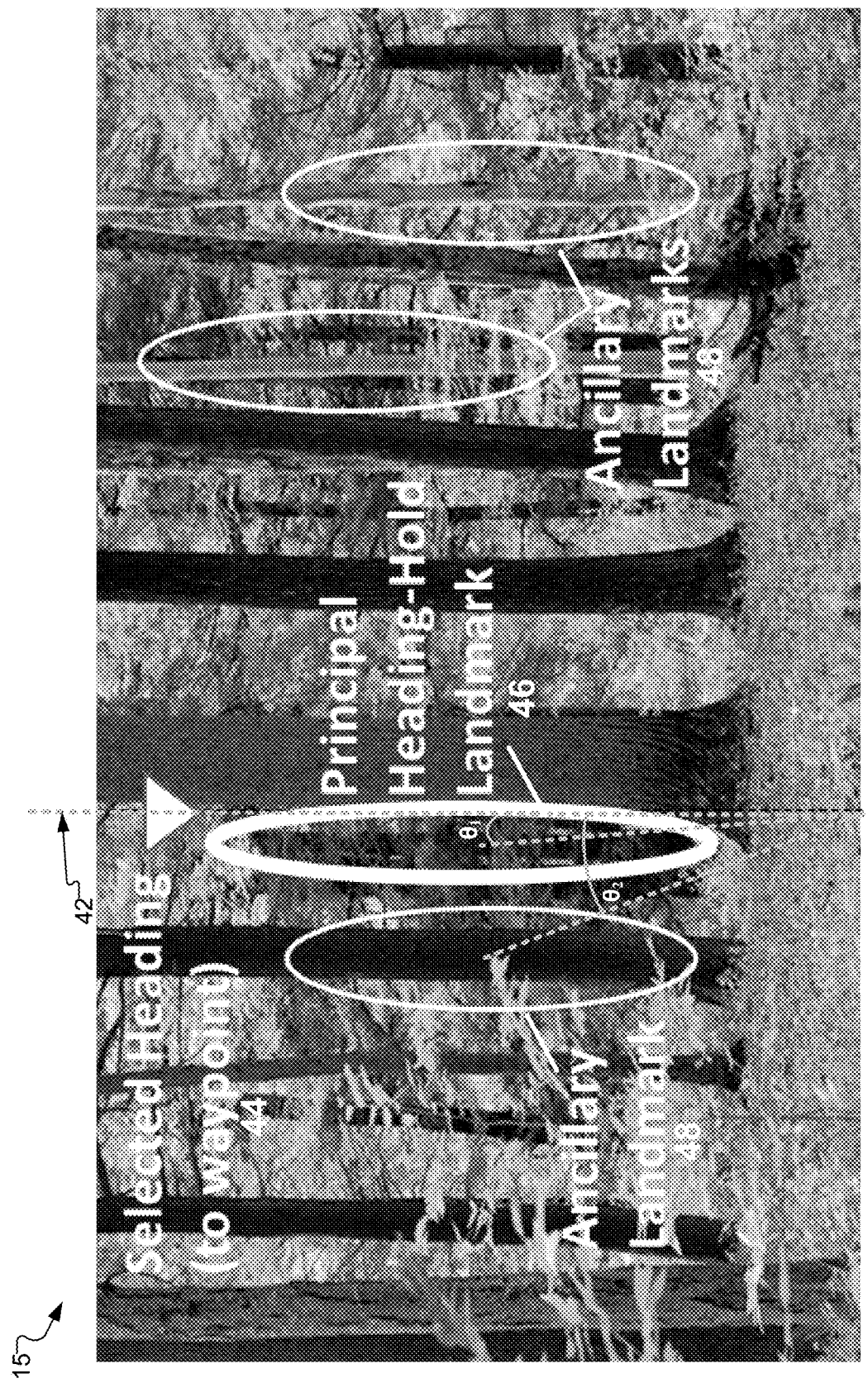

Referring again to FIGS. 1 and 2, the visual navigation system 10 may provide the compass measurements 12a to an image sensor 14, in communication with the compass 12, so that the image sensor 14 captures a series of successive navigation images 15 (shown as 15a-15k in FIG. 1) in or along the heading direction 42. Initially, a first navigation image 15 is captured in the heading direction 42 (step 120). For example, the image sensor 14 may capture a navigation image 15 of an exemplary open terrain (such as in FIG. 4A) or an exemplary forested terrain (such as shown in FIG. 4B). The navigation image 15 is taken in the heading direction 42 selected by the user 40 based on the compass measurements 12a. In FIGS. 4A and 4B, the heading direction 42 is shown as a dashed line and is provided from a position of the image sensor 14, which may be held by the user 40 or in a vehicle transporting the user 40 or from the position of the user 40. For example, the user 40 may use a camera of a smartphone to take a picture of the landscape in the direction the user wishes to travel.

The visual navigation system 10 may store the navigation image 15 in data storage memory 16 and a navigation processor 18, coupled to the data storage memory 16, analyzes the navigation image 15 and identifies one or more principal markers 46 (step 130) and/or identifies one or more ancillary markers 48 (step 140) from the reference markers based on their distance away from the travel direction 42 from the view point of the user 40 facing in the travel direction 42 or the image sensor 14 taking the navigation image 15.

As mentioned above, the one or more principal markers 46 are selected close to or along the heading direction 42, e.g., within a principal angle, $\theta_1$, from the heading direction 42 and the one or more ancillary markers 48 are selected further away from the heading direction 42, e.g., within an ancillary angle, $\theta_2$, from the travel direction 42, such that the ancillary angle, $\theta_2$, is greater than the principal angle, $\theta_1$. For example, the one or more principal markers 46 may be less than 10 degrees away from the heading direction 42 and the one or more ancillary markers 48 may be greater than or equal to 10 degrees away from the heading direction 42. The angles for the principal angle and the ancillary angle may change from navigation image 15 to navigation image 15 and may be selected based on the number and location of the reference markers within the field of view of the navigation image 15. The one or more principal markers 46 may be selected as far away from a position of user 40 or the image sensor 14 and close to the waypoint 44 or target designation as possible. The one or more ancillary markers 48 may be selected significantly "off-heading" or away from the heading direction 42 and may be selected closer to a position of the user 40 or the image sensor 14 as compared to the one or more principal markers 46. As known by one skilled in the art, stereo imagery or other conventional range finding devices may be used to determine the distance from the user 40 or image sensor 14 and the reference markers. The navigation processor 18 may automatically select the one or more principal markers 46 and/or the one or more ancillary markers 48 based on some designated criteria. Alternatively, the visual navigation system 10 may provide one or more options of potential reference markers for the user 40 to choose via a user interface 22.

After the first navigation image 15 is captured, a second, subsequent navigation image 15 is captured (step 150) as the user 40 travels in the heading direction 42. The visual navigation system 10 may store the second navigation image 15 in the data storage memory 16 and the navigation processor 18 analyzes the second navigation image 15 and identifies one or more principal markers 46 and/or one or more ancillary markers 48 from the previously identified reference markers in the first navigation image 15 (step 160), i.e., one or more principal markers 46 and/or one or more ancillary markers 48 that also appear in the first navigation image 15.

For example, FIGS. 5A-5C schematically show of a series of successive navigation images 15 with only the principal markers 46 and the ancillary markers 48 abstracted from the navigation images 15. Any number of navigation images 15 may be captured by the visual navigation system 10. However, to illustrate principles of operation of the visual navigation system 10, three, of possibly many more, navigation images 15 are shown in FIGS. 5A-5C. FIG. 5D shows the navigation image 15 shown in FIG. 4B with the abstracted principal marker 46 and ancillary markers 28 from FIG. 5B superimposed on the captured navigation image 15. In FIG. 5A, one principal marker 46 and three ancillary markers 48 (shown as 48a-48c) are shown. The principal marker 46 and ancillary markers 48a-48c are further away from the user 40 than in FIGS. 5B and 5C. The ancillary marker 48a closest to the principal marker 46 is spaced apart from the principal marker 46 by a distance X1. FIG. 5B shows the next navigation image 15 in the sequence of successive navigation images 15 as the user 40 moves along the heading direction 42. In FIG. 5B, the ancillary markers 48a, 48b are further away from the principal marker 46 while the ancillary marker 48c has moved out of the field of view of the navigation image 15. The ancillary marker 48a is now spaced apart from the principal marker 46 by a distance X2. The principal marker 46 and ancillary markers 48a and 48b appear wider in the navigation image 15, but the principal marker 46 remains along the heading direction 42. FIG. 5C shows the last navigation image 15 in the sequence of successive navigation images 15 as the user 40 moves along the heading direction 42. In FIG. 5C, the ancillary marker 48a is further away from the principal marker 46 while the ancillary marker 48b has moved out of the field of view of the navigation image 15. The ancillary marker 48a is now spaced apart from the principal marker 46 by a distance X3. One or more new principal markers 46 and/or new ancillary markers 48 may be continuously selected by the navigation processor 18 as the user 40 continues to travel along the heading direction 42 until the user 40 reaches the waypoint 44 or final destination.

The navigation processor 18 analyzes a position of the principal marker(s) 46 and/or the ancillary marker(s) 48 in one or more of the successive navigation images 15 compared to one or more of the other successive navigation images 15 and determines heading direction information 20 based on this analysis. The heading direction information 20 is then provided to the user 40, through a user interface 22, which is coupled to the navigation processor 18 (step 170). For example, the user interface 22 may provide the heading direction information 20 to the user 40 through an audio output, visual output and/or tactile output. The navigation method may repeat the process (steps 110-170 or some subset thereof) until a user 40 reaches the waypoint 44 or final destination (step 180). The visual navigation system 10 and navigation method 100 allow the user 40 to maintain a more accurate heading direction 42 and to minimize the errors associated with only following compass measurements 12a.

The visual navigation system 10 may include at least one navigation filter 24 configured to process the compass measurements 12a from the compass 12 and/or the relative change in position of the one or more principal markers 46 and/or one or more ancillary markers 48 from the series of successive navigation images 15 in order to estimate the heading direction information 20. The navigation processor 18 may store previously estimated heading direction information 20 in the data storage memory 16, and use this estimated heading direction information 20 along with the compass measurements 12a and/or the relative change in reference marker position to provide a further estimate of the heading direction information 20. The navigation filter 24 may include a Kalman filter, a particle filter, a nonlinear moment filter, a Hidden Markov Model, and/or a Bayesian filter or any other suitable filter or model.

Heading-Hold Navigation with Correction

Embodiments of the visual navigation system 10 may further include additional information from a variety of sources, along with the compass measurements 12a and the navigation images 15, to better estimate the heading direction information 20. For example, a compass 12 generally has random bias in addition to other errors. To reduce the drift mechanisms that are inherent in the compass 12, two or more compass measurements 12a, taken at different locations when traveling along the heading direction 42, may be integrated over time and used along with the relative change in position of the one or more principal markers 46 and/or one or more ancillary markers 48 from the series of successive navigation images 15 described above in heading-hold navigation. The data storage memory 16 may store the two or more compass measurements 12a, the navigation filter 24 may process the two or more compass measurements 12a, and the navigation processor 18 may use the processed compass measurements in order to estimate the heading direction information 20. The navigation filter 24 may compute an average of the two or more compass measurements 12a and the average may be used by the navigation processor 18 along with the relative change in position of the principal markers 46 and/or the ancillary markers 28 in the successive navigation images 15 to estimate the heading direction information 20. Other processing methods may also be used by the navigation filter 24 as known by one skilled in the art.

The visual navigation system 10 may further include inertial navigation information provided by an inertial measurement unit (IMU) sensor 26 to the navigation processor 18, e.g., accelerations and angular rates from accelerometers and gyroscopes. The navigation filter 24 may integrate this data over a period of time to estimate a relative change in the geolocation position of the user 40 or the image sensor 14. The navigation processor 18 may determine the heading direction information 20 further based on the inertial navigation information. For example, the inertial navigation information may include a step-count estimate based on the distance traveled by the user 40 or a tread/wheel-turn estimate for distance traveled by a vehicle transporting the user 40. For instance, a soldier traveling north in a "GPS-denied" area may use a compass in an attempt to keep moving in the desired direction and also rely on the length of his or her paces, which cannot be completely uniform due the soldier's imperfect sensory-motor system. The inertial navigation information provides a more accurate estimate of the distance traveled by the user 40.

The visual navigation system 10 may further include landmark information provided by a landmark map 28 to the navigation processor 18, at least a portion of the landmark information corresponding to one or more of the reference markers. The navigation processor 18 may further identify one or more of the principal markers 46 and/or one or more of the ancillary markers 48 from the landmark information, and the navigation processor 18 may determine the heading direction information 20 further based on the landmark information. For example, the navigation processor 18 may identify one or more features to track that are present in the series of navigation images 15. The one or more features may be principal markers 46 or ancillary markers 48. For example, the navigation processor 18 may select a particular bend in a river as an ancillary marker 48 and track the feature along with the one or more principal markers 46 and/or one or more other ancillary markers 48. The navigation processor 18 may determine the changing position of the bend in the river in successive navigation images 15 and apply the navigation filter 24 to this data to estimate a relative change in the geolocation position of the user 40 and use that information to determine the heading direction information 20.

The visual navigation system 10 may further include altitude information provided by a pressure altimeter 30 to the navigation processor 18 and topographic map information provided by a topographic map 32 to the navigation processor 18. The navigation processor 18 may determine navigation information based on the altitude information in conjunction with the topographic map information, such as described in U.S. Pat. No. 8,443,662, which is incorporated by reference herein in its entirety. The navigation processor 18 determines the heading direction information further based on the navigation information. For example, the topographic map database may be carried on a vehicular platform, which includes the visual navigation system 10, and the navigation processor 18 may process the database information using conventional landmark matching techniques. The landmark matching techniques, such as known by one skilled in the art, may be used to re-acquire one or more principal markers 46 and/or ancillary markers 48, whenever possible, within the collected and abstracted landmark database of landmark data. Embodiments of the present invention may observe and log arbitrary landmarks in the heading direction 42, and automatically keep track of particular landmarks in order to maintain a heading direction 42 while traveling towards a waypoint 44. Landmark matching techniques may be used to keep track of landmarks while they remain visible and re-acquire earlier landmarks as they become visible again.

FIGS. 6A-6D show the results of Monte Carlo simulations that were performed to show the improvement in accuracy with various navigation systems and methods described herein compared to standard navigation methods using only a compass.

As known by one skilled in the art, integration of random errors from instruments yields error statistics that are exponential functions of time. The longer the time, the worse the errors. Discrete processes such as updates obey similar schemes:

$\sigma_W$ is the std of the process

First integral $-\sigma_{RW}=\sigma_W\sqrt{k}$, k is the number of the sample

Second integral –

$$\sigma_{IRW} = \sigma_W \sqrt{\frac{k^3}{3}}$$

Where, $Q^2$=noise level, $T_s$=sampling time

For a stationary instrument, $\sigma_W=Q^2/T_s=1$

For random walk, $\sigma_{RW}=Q\sqrt{t}=3.2$

For integrated random walk and t=1000

$$\sigma_{IRW} = Q\sqrt{\frac{t^3}{3}} = 1826$$

Figure 6A:
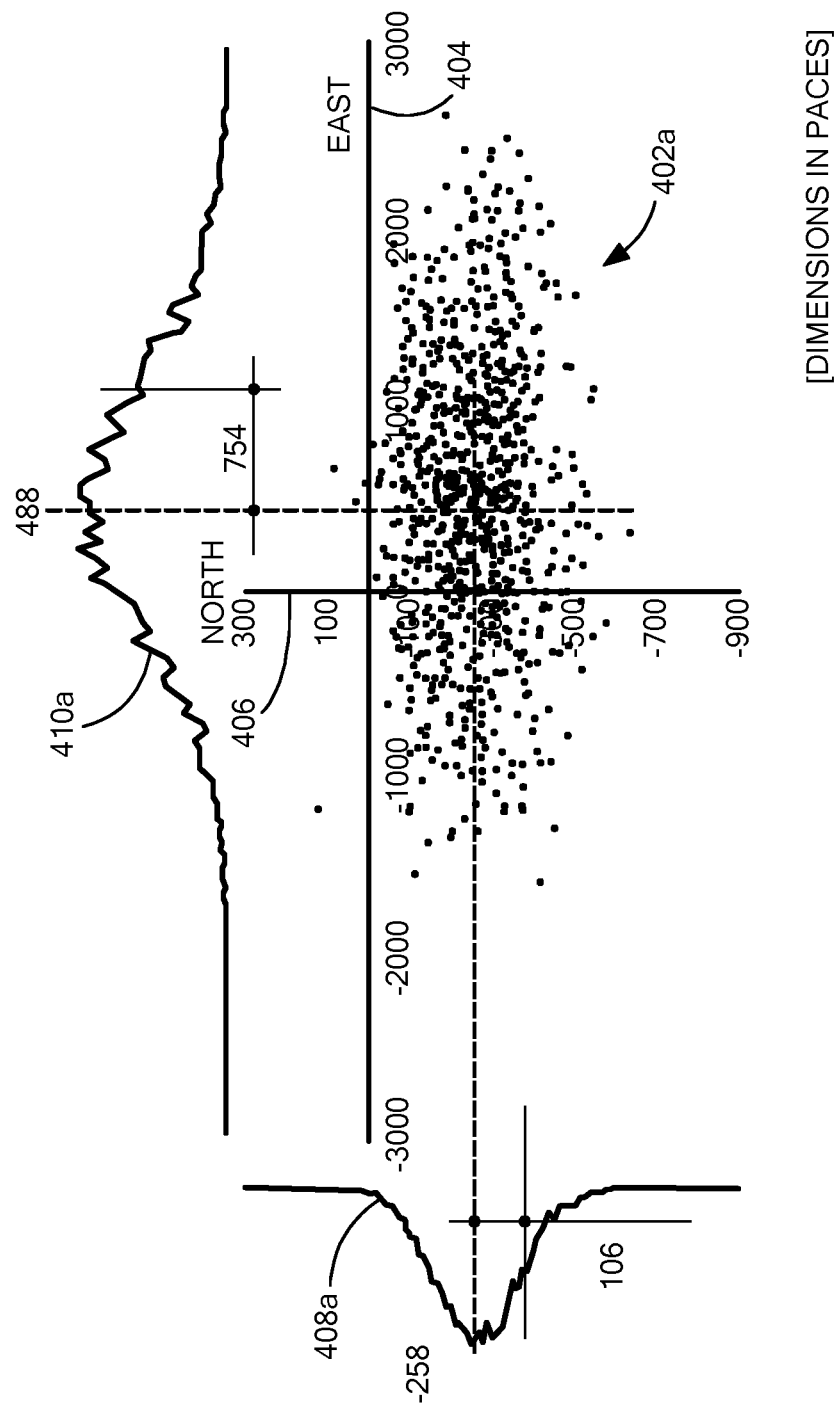
FIG. 6A is a plot of a simulation illustrating the effect of error inherent in the use of a compass alone in navigating to a desired destination.

In FIG. 6A, a plot of a simulation illustrating the effect of error inherent in the use of a compass alone in navigating to a desired direction. In this example, the user checks a compass every 1000 paces toward north, the desired direction. The data 402a represents the paces of the user in navigating north and was generated using 100,000 paces. Relevant parameters for this simulation are given by Table 1 below. The first axis 404 of the plot is in the north to south direction and a second axis 406 is in the east to west direction with the scale being in the number of paces. The error present in navigation is modeled by a Gaussian distribution. The plot illustrates this error in navigation with distributions 408a, 410a of the user's paces 402a in each of the first and second axes 404, 406. In this example, error distribution 408a in the first axis 404 has a mean ($\mu$=−258) and variance ($\sigma^2$=106) and error distribution 410a in the second axis 406 has a mean ($\mu$=488) and variance ($\sigma^2$=754). The biases (or errors) of the user's paces and compass can result in these significant variances.

The exemplary compass used in the simulations herein has an error with mean $\mu_C$=0 and standard deviation $\sigma_C$ as provided below. The simulations also use the below parameters in modeling errors in the stride and gait of the user in each type of navigation.

TABLE 1

Parameters used in the Monte Carlo simulation.

| Parameter | Value | Units |
|---|---|---|
| Compass bias | 0.3 | degrees |
| Compass standard deviation $\sigma_C$ | 1 | degrees |
| Stride-length standard deviation $\sigma_S$ | 0.3 | degrees |
| Gait-drift bias | 4 | degrees |
| Gait-drift standard deviation $\sigma_G$ | 1 | degrees |
| Paces before reset | 1,000 | paces |
| Length of simulation | 100,000 | paces |
| Map error | 50 | paces |
| Monte Carlo runs | 5,000 | |

As mentioned above, the exemplary compass used in the simulations has mean 0 and standard deviation a. Further, between successive resets i and i+1, a series of n interim measurements are taken of the desired direction. Thus, the error in the mean of these measurements (which is denoted by $\epsilon_{i+1}$) has mean 0 and standard deviation $\sigma/\sqrt{n}$.

At each reset along the route, we have:

The corrective term coming from the previous reset $C_{i-1}$ (note $C_0$=0)

The current measurement of the desired direction $\theta_i$

The corrected direction $D_i=C_{i-1}+\theta_i$

The cumulative corrected direction $S_i=S_{i-1}+D_i$

The estimated true direction $\epsilon_i$

The corrective term $C_i$ for the current reset=$\epsilon_i-S_i$

The correlation is determined between successive corrected directions $D_i$ and $D_{i+1}$. From the definition of correlation, we have $$\rho(D_i, D_{i+1}) = \frac{E(D_i D_{i+1})}{\sigma^2} = \frac{E((C_{i-1}+\theta_i)(C_i+\theta_{i+1}))}{\sigma^2}$$

Now, $E((C_{i-1}+\theta_i)(C_i+\theta_{i+1}))=E(C_{i-1}C_i+C_{i-1}\theta_{i+1}+\theta_i C_i+\theta_i\theta_{i+1})$.

Note that $E(C_{i-1})=E(C_i)=E(\theta_i)=E(\theta_{i+i})=0$, and since the variables are independent, $E(C_{i-1}C_i)=E(C_{i-1}\theta_{i+1})=E(\theta_i\theta_{i+1})=0.$ And $E(\theta_i C_i)$ is derived. From above, $C_i=\epsilon_i-S_i=\epsilon_i-(S_{i-1}+C_{i-1}+\theta_i)=-\theta_i+(\epsilon_i-\epsilon_{i-1})$ So that $C_i\approx-\theta_i$, and $\theta_i C_i\approx-\theta_i^2$ has a non-central chi-square distribution with mean=$-\theta^2$. Since $C_{i-1}$ and $\theta_i$ are both normally distributed with mean 0 and standard deviation $\sigma$, $D_i$ is normally distributed with mean 0 and standard deviation $\sigma\sqrt{2}$, and $$\rho(D_i, D_{i+1}) = \frac{-\sigma^2}{2\sigma^2} = -0.5.$$

The variance is now derived of the sum of $D_i$ and $D_{i+1}$. Thus, $\theta_{D_i+D_{i+1}}=\sqrt{\sigma_{D_i}^2+\sigma_{D_i}^2+2\rho(D_i,D_{i+1})\sigma_{D_i}\sigma_{D_{i+1}}}$ is known.

Now, since $\sigma_{D_i} = \sigma_{D_{i+1}}$, this reduces to $$\sigma_{D_i+D_{i+1}} = \sqrt{2\sigma_{D_i}^2 + 2(-0.5)\sigma_{D_i}^2} = \sigma_{D_i}$$

Thus, the variance of the sum of $D_i$ and $D_{i+1}$ is the same as the variance of $D_i$, and by extension the variance of the sum of all the angle measurements is the same as the variance of the individual angle measurement.

The exemplary visual navigation system 10 described herein may be used to reduce or eliminate these errors and/or biases.

Figure 6B:
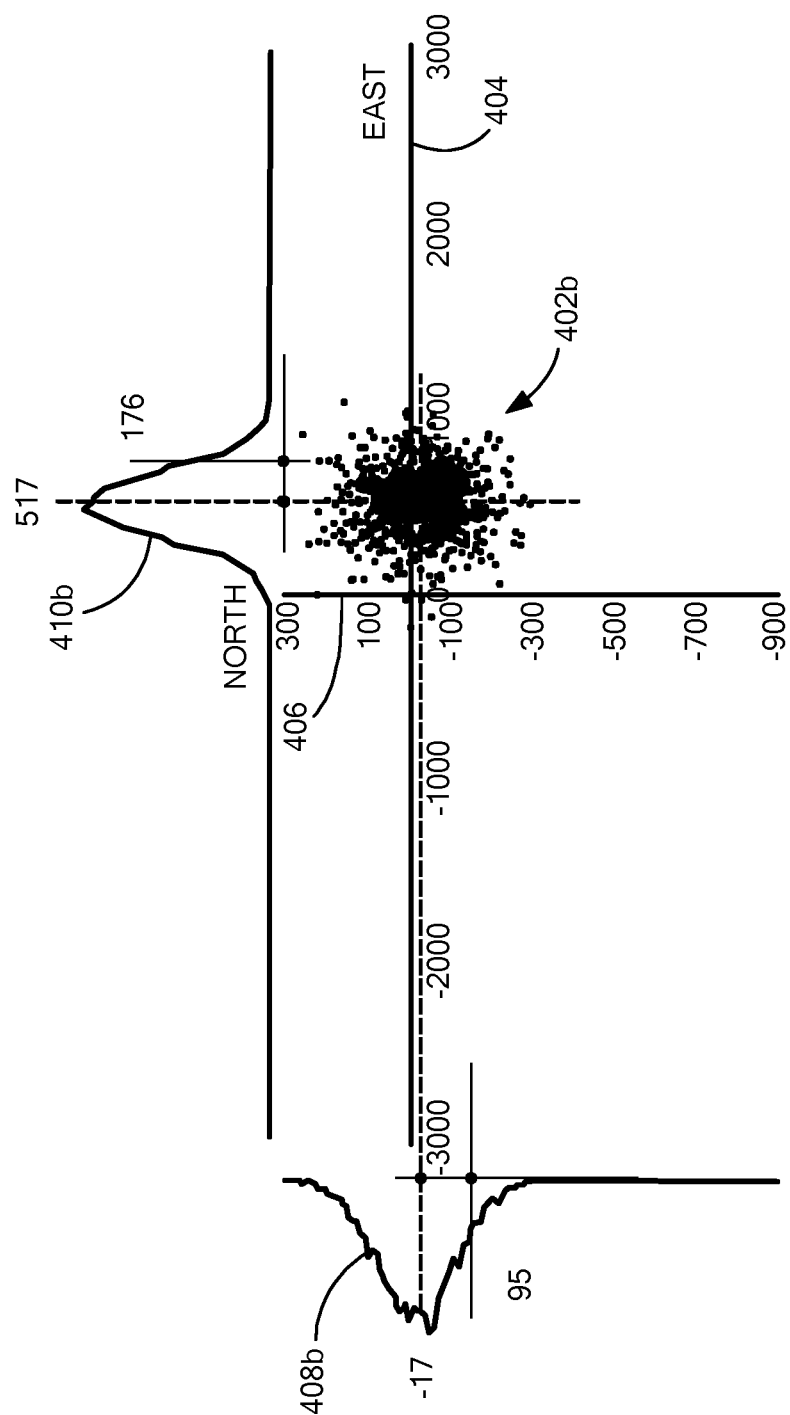
FIG. 6B is a plot of a simulation illustrating the effect of error in the use of "heading-hold" navigation in navigating to a desired destination according to an embodiment of the present invention.

FIG. 6B is a plot of a simulation illustrating the effect of error in the use of a compass with "heading-hold" navigation (as described above) in navigating to a desired destination. In this example, the user 40 selects principal markers 46 approximately every 1000 paces in the direction of north, as indicated by the compass 12. As described above, the navigation system 10 may also automatically selects the principal markers 46 for the user 40. The resulting error distribution 408b in the first axis 404 has a mean ($\mu=-17$) and variance ($\sigma^2=95$) and error distribution 410b in the second axis 406 has a mean ($\mu=517$) and variance ($\sigma^2=176$). Note that the error of the data 402b is reduced along at least one axis. This can be seen in the reduction in both the mean and variance of the navigation error in the plots of FIG. 6B compared to FIG. 6A. The user's walking execution error is reduced while the compass error remains.

Figure 6C:
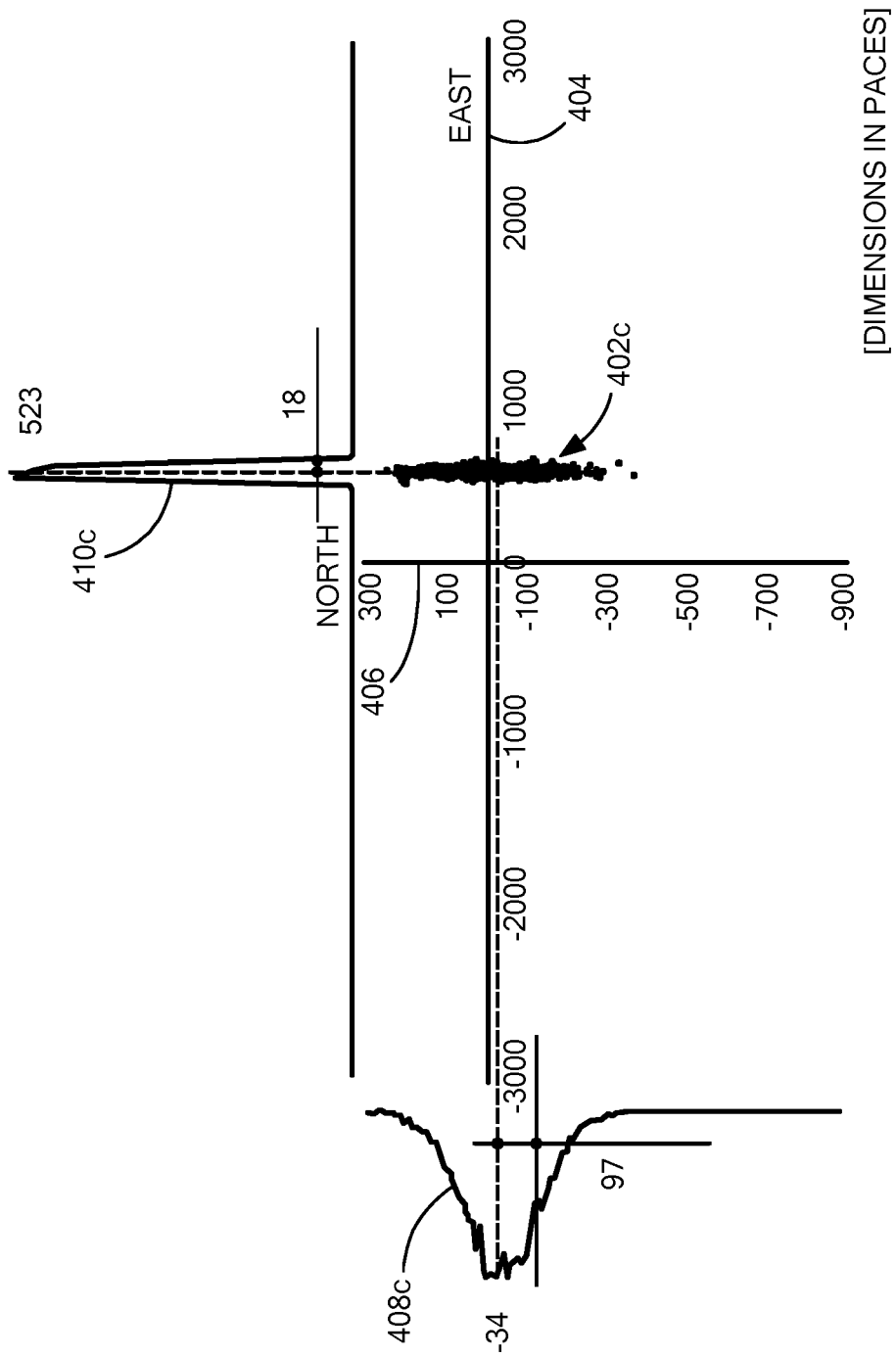
FIG. 6C is a plot of a simulation illustrating the effect of error in the use of "heading-hold" navigation with corrections in navigating to a desired destination according to an embodiment of the present invention.

FIG. 6C is a plot of a simulation illustrating the effect of error in the use of heading-hold navigation with corrections in navigating in a desired direction, which in this example is "north." In this type of navigation, the user 40 selects a principal marker 46 every 1000 paces with the use of the compass 12 and navigation system 10 and stops every 100 paces to read the compass measurements 12a. Once the user 40 arrives at the principal marker 46, the user 40 or the navigation system 10 takes 10 readings of the compass 12 in the desired direction 42. Next, the 10 readings are averaged to determine the extent of the error in selecting the principal marker 46 in the desired direction 42. In a simulation of this type of navigation, error distribution 408c in the first axis 404 was found to have a mean ($\mu=-34$) and variance ($\sigma^2=97$) and error distribution 410c in the second axis 406 was found to have a mean ($\mu=523$) and variance ($\sigma^2=18$). Note that the distributions 408c, 410c of the 100,000 simulated paces have smaller overall variances than those simulated in FIG. 6B or FIG. 6A. Specifically, the distribution 408c has a similar mean and variance to that of distribution 408b but distribution 410c has a greatly reduced variance as compared to distribution 410b. This reduction in variance is due to the averaging of readings and correcting of errors over time. Thus, this type of navigation improves upon the heading-hold navigation provided in FIG. 6B.

Figure 6D:
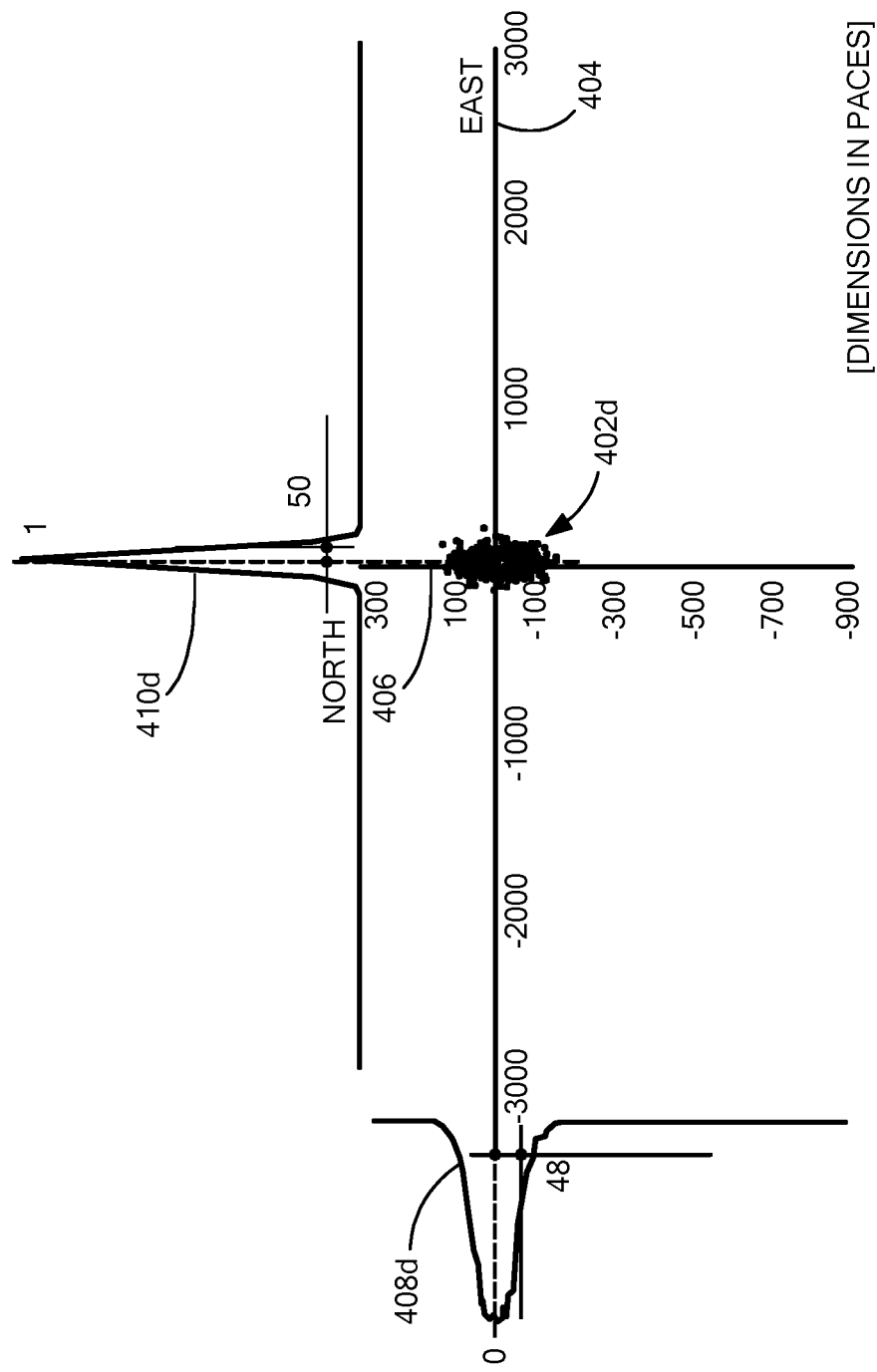
FIG. 6D is a plot of a simulation illustrating the effect of error in the use of visual navigation with a map in navigating to a desired destination according to an embodiment of the present invention.

FIG. 6D is a plot of a simulation illustrating the effect of error in the use of a compass 12 with a map in navigating in a desired direction 42, which in this example is "north." In this type of navigation (called "breadcrumbs navigation"), the user 40 identifies principal markers 46 on a map every 1000 paces in the desired direction 42. However, the locations of the principal markers 46 on the map are not certain. In a simulation of this type of navigation, error distribution 408d in the first axis 404 has a mean ($\mu=0$) and variance ($\sigma^2=48$) and error distribution 410d in the second axis 406 has a mean ($\mu=1$) and variance ($\sigma^2=50$). Note that these distributions 408d, 410d have smaller overall means than those simulated in any of FIGS. 6A-6C. The variances of distributions 408d, 410d remain constant and are determined by the uncertainties of the map. Note that, in some embodiments, the user 40 can increase navigational accuracy and/or reduce errors by relying on additional information, e.g., stellar sightings aided by celestial maps.

For FIGS. 6A and 6B, the North and East variances grow linearly with distance, e.g., for the compass part, $\sigma_X = L\sigma_W \sqrt{k}$, where $\sigma_W$ is the variance of the compass, k is the number of stretches walked between updates, and L is the length of each of the stretches. FIG. 6B only removes the execution errors, but remains affected by the compass errors and the variability of paces. FIG. 6C bounds the East variance to the variance of the compass $\sigma_C = L\sigma_W$, which remains constant. For FIG. 6D, both the North and East variances remain constant and equal to the uncertainties of the map. Depending on the reference markers and the situation for the user 40, heading-hold navigation, heading-hold navigation with correction, or heading-hold navigation with correction and/or maps may provide an improved, acceptable solution for the user 40. For example, a dismounted soldier may have landmarks spaced far apart, and to reach them, he or she might resort to using any of these navigation systems and methods.

In some embodiments, one or more characteristics of the reference markers may be stored in a database. For example, characteristics such as color, shape, dimensions, position, etc. may be extracted from each reference marker. In identifying one or more reference markers in the second navigation image 15, the navigation processor 18 may access the database to compare the one or more characteristic to the stored characteristic. These stored characteristics may be used to enable the visual navigation system 10 to better identify what the reference marker is (e.g., tree, telephone pole, giraffe neck) and may be used to better decide which reference markers to use. For example, the visual navigation system 10 may select one or more reference markers that are less likely to move over time.

In some embodiments, as the user 40 navigates toward a first principal marker 46, the first principal marker 46 may be replaced by a second principal marker 46 that is further away from the user 40 as compared to the first principal marker 46. Initially, the navigation system 10 may detect another principal marker 46 proximate to the heading direction 42. The navigation system 10 may automatically exchange the first principal marker 46 for the second principal marker 46 or prompt the user 40 to affirmatively select the second principal marker 46.

If a principal marker 46 falls out of the field of view of the navigation images 15 taken by the image sensor 14, the navigation system 10 may use one or more ancillary markers 48 visible in the navigation image 15 to hold heading, monitor track offset, and/or correct back to the heading direction 42 in case the user 40 has significantly drifted with his or her actual travel path 50. The navigation system 10 may establish a new principal marker 46 as soon as possible after losing sight of a previous principal marker 46.

While the illustrated navigation system 10 and method 100 are primarily discussed in the context of land navigation, navigation systems and methods may be applied to air and sea navigation. In one or more exemplary embodiments, the visual navigation system 10 may be a handheld electronic device, such as a phone, tablet, laptop, watch, glasses, PDA, etc., or integrated with a handheld electronic device or within headwear, clothing, etc.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In an alternative embodiment, the disclosed systems and methods may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the visual navigation system and navigation method.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the disclosure.

What is claimed is:

1. A visual navigation system for navigating toward a heading direction, the system comprising:
   a compass providing compass measurements configured to orient a user in the heading direction;
   an image sensor, in communication with the compass, the image sensor configured to capture a series of successive navigation images in the heading direction oriented by the compass measurements, one or more of the navigation images having at least two reference markers;
   data storage memory configured to store the series of successive navigation images;
   a navigation processor, coupled to the data storage memory, configured to:
   (a) identify at least one principal marker from the at least two reference markers, the at least one principal marker positioned within a principal angle relative to the heading direction, oriented by the compass measurements, from a position of the image sensor;
   (b) identify at least one ancillary marker from the at least two reference markers, the at least one ancillary marker positioned within an ancillary angle relative to the heading direction, oriented by the compass measurements, from the position of the image sensor, the ancillary angle greater than the principal angle; and
   (c) determine heading direction information based on a position of the at least one principal marker and/or a position of the at least one ancillary marker in the successive navigation images, such that the position of the at least one principal marker and/or the position of the at least one ancillary marker correct errors in the heading direction based on the compass measurements; and
   a user interface, coupled to the navigation processor, configured to provide the heading direction information to the user.

2. The visual navigation system according to claim 1, wherein the data storage memory is further configured to store two or more compass measurements, each compass measurement taken at a different location when traveling in the heading direction, and the navigation processor further includes a navigation filter configured to process the two or more compass measurements, wherein the navigation processor determines the heading direction information further based on the processed two or more compass measurements.

3. The visual navigation system according to claim 2, wherein the navigation filter computes an average of the two or more compass measurements and uses the average along with the position of the at least one principal marker and/or the position of the at least one ancillary marker in the successive navigation images to estimate the heading direction information.

4. The visual navigation system according to claim 1, wherein the navigation processor is further configured to receive landmark information from a landmark map, at least a portion of the landmark information corresponding to one or more of the reference markers, wherein the navigation processor further identifies the at least one principal marker from the landmark information and/or further identifies the at least one ancillary marker from the landmark information, and the navigation processor is configured to determine the heading direction information further based on the landmark information.

5. The visual navigation system according to claim 1, wherein the navigation processor is further configured to determine the heading direction information by comparing (a) the position of the at least one principal marker in the one or more navigation images to a subsequent position of the at least one principal marker in one or more subsequent navigation images taken at a time after the one or more navigation images and/or (b) the position of the at least one ancillary marker in the one or more navigation images to a subsequent position of the at least one ancillary marker in one or more subsequent navigation images taken at a time after the one or more navigation images.

6. The visual navigation system according to claim 1, wherein the navigation processor is further configured to receive inertial navigation information from an inertial measurement unit sensor, wherein the navigation processor is configured to determine the heading direction information further based on the inertial navigation information.

7. The visual navigation system according to claim 6, wherein the inertial navigation information includes a step-count-based estimate for distance traveled by the user or a tread/wheel-turn-based estimate for distance traveled by a vehicle transporting the user.

8. The visual navigation system according to claim 1, wherein the navigation processor is further configured to receive altitude information from a pressure altimeter and configured to receive topographic map information from a topographic map, wherein the navigation processor is further configured to determine navigation information based on the altitude information in conjunction with the topographic map information and configured to determine the heading direction information further based on the navigation information.

9. The visual navigation system according to claim 1, wherein the compass, the image sensor, the data storage memory, the navigation processor, and the user interface are contained within a hand-held device.

10. The visual navigation system according to claim 1, wherein the user interface includes an audio output, visual output, tactile output or any combination thereof.

11. A method for navigating toward a heading direction, the method comprising:
 providing a compass having compass measurements configured to orient a user in the heading direction;
 capturing a series of successive navigation images in the heading direction oriented by the compass measurements using an image sensor, one or more of the navigation images having at least two reference markers;
 storing the series of successive navigation images in a data storage memory;
 identifying at least one principal marker from the at least two reference markers, the at least one principal marker positioned within a principal angle relative to the heading direction, oriented by the compass measurements, from a position of the image sensor;
 identifying at least one ancillary marker from the at least two reference markers, the at least one ancillary marker positioned within an ancillary angle relative to the heading direction, oriented by the compass measurements, from the position of the image sensor, the ancillary angle greater than the principal angle;
 determining heading direction information based on a position of the at least one principal marker and/or a position of the at least one ancillary marker in the successive navigation images, such that the position of the at least one principal marker and/or the position of the at least one ancillary marker correct errors in the heading direction based on the compass measurements; and
 providing the heading direction information to a user interface.

12. The method according to claim 11, further comprising:
 storing two or more compass measurements in the data storage memory, each compass measurement taken at a different location when traveling in the heading direction; and
 processing the two or more compass measurements using a navigation filter, wherein determining the heading direction information is further based on the processed two or more compass measurements.

13. The method according to claim 12, wherein processing the two or more compass measurements includes computing an average of the two or more compass measurements, and determining the heading direction information is further based on the average.

14. The method according to claim 11, further comprising providing landmark information from a landmark map, at least a portion of the landmark information corresponding to one or more of the reference markers, wherein identifying the at least one principal marker further comprises identifying the at least one principal marker from the landmark information and/or identifying the at least one ancillary marker further comprises identifying the at least one ancillary marker from the landmark information, and determining the heading direction information is further based on the landmark information.

15. The method according to claim 11, wherein the determining includes (a) comparing the position of the at least one principal marker in the one or more navigation images to a subsequent position of the at least one principal marker in one or more subsequent navigation images taken at a time after the one or more navigation images and/or (b) comparing the position of the at least one ancillary marker in the one or more navigation images to a subsequent position of the at least one ancillary marker in one or more subsequent navigation images taken at a time after the one or more navigation images.

16. The method according to claim 11, further comprising providing inertial navigation information from an inertial measurement unit, wherein determining the heading direction information is further based on the inertial navigation information.

17. The method according to claim 16, wherein the inertial navigation information includes a step-count-based estimate for distance traveled by the user or a tread/wheel-turn-based estimate for distance traveled by a vehicle transporting the user.

18. The method according to claim 11, further comprising:
 providing altitude information from a pressure altimeter;
 accessing a topographic map having topographic map information; and
 determining navigation information based on the altitude information and the topographic map information, wherein determining the heading direction information is further based on the navigation information.

19. A computer program product including non-transitory computer-readable medium having computer code thereon for navigating toward a heading direction, the computer code comprising:
 program code for providing compass measurements from a compass, the compass measurements configured to orient a user in the heading direction;
 program code for capturing a series of successive navigation images in the heading direction oriented by the compass measurements using an image sensor, one or more of the navigation images having at least two reference markers;
 program code for storing the series of successive navigation images in a data storage memory;
 program code for identifying at least one principal marker from the at least two reference markers, the at least one principal marker positioned within a principal angle relative to the heading direction, oriented by the compass measurements, from a position of the image sensor;
 program code for identifying at least one ancillary marker from the at least two reference markers, the at least one ancillary marker positioned within an ancillary angle relative to the heading direction, oriented by the compass measurements, from the position of the image sensor, the ancillary angle greater than the principal angle;
 program code for determining heading direction information based on a position of the at least one principal marker and/or a position of the at least one ancillary marker in the successive navigation images, such that the position of the at least one principal marker and/or the position of the at least one ancillary marker correct errors in the heading direction based on the compass measurements; and program code for providing the heading direction information to a user interface.

20. The computer program product according to claim 19, further comprising:

program code for storing two or more compass measurements in the data storage memory, each compass measurement taken at a different location when traveling in the heading direction; and program code for processing the two or more compass measurements using a navigation filter, wherein program code for determining the heading direction information is further based on the processed two or more compass measurements.

21. The computer program product according to claim 20, wherein the program code for processing the two or more compass measurements includes computing an average of the two or more compass measurements, and the program code for determining the heading direction information is further based on the average.

22. The computer program product according to claim 19, further comprising program code for providing landmark information from a landmark map, at least a portion of the landmark information corresponding to one or more of the reference markers, wherein the program code for identifying the at least one principal marker further comprises program code for identifying the at least one principal marker from the landmark information and/or the program code for identifying the at least one ancillary marker further comprises program code for identifying the at least one ancillary marker from the landmark information, and the program code for determining the heading direction information is further based on the landmark information.

23. The computer program product according to claim 19, wherein the program code for determining includes program code for comparing (a) the position of the at least one principal marker in the one or more navigation images to a subsequent position of the at least one principal marker in one or more subsequent navigation images taken at a time after the one or more navigation images and/or (b) the position of the at least one ancillary marker in the one or more navigation images to a subsequent position of the at least one ancillary marker in one or more subsequent navigation images taken at a time after the one or more navigation images.

24. The computer program product according to claim 19, further comprising program code for providing inertial navigation information from an inertial measurement unit, wherein the program code for determining the heading direction information is further based on the inertial navigation information.

25. The computer program product according to claim 24, wherein the inertial navigation information includes a step-count-based estimate for distance traveled by the user or a tread/wheel-turn-based estimate for distance traveled by a vehicle transporting the user.

26. The computer program product according to claim 19, further comprising:

program code for providing altitude information from a pressure altimeter;

program code for accessing a topographic map having topographic map information; and program code for determining navigation information based on the altitude information and the topographic map information, wherein the program code for determining the heading direction information is further based on the navigation information.

* * * * *